March 22, 1960
R. D. SNOW
2,929,106
PROCESS OF MANUFACTURE OF HOLLOW SPHERES
Filed Dec. 31, 1954
2 Sheets-Sheet 1
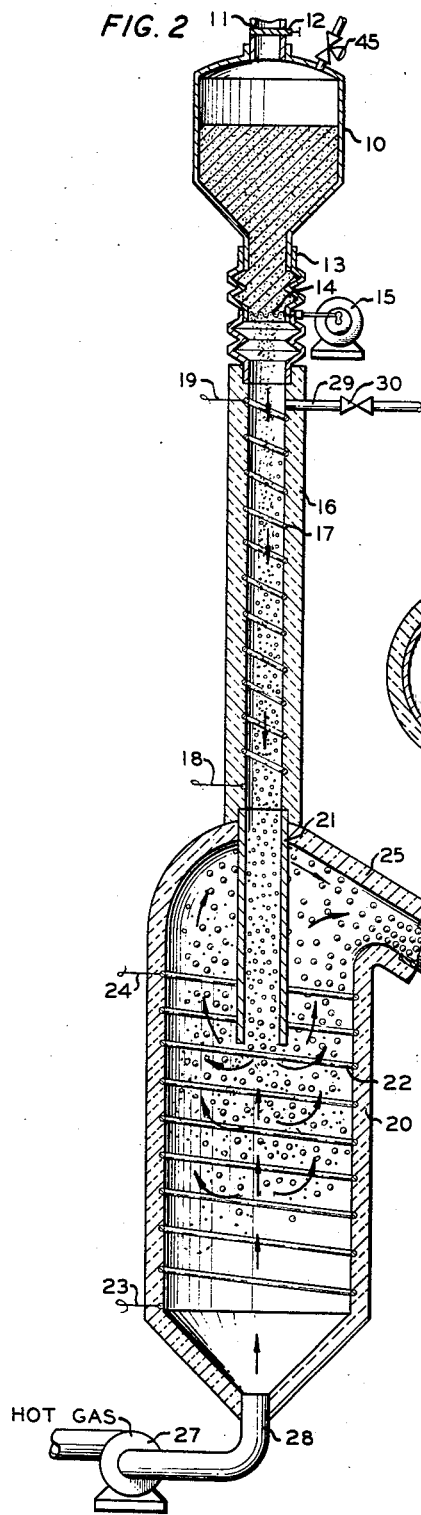
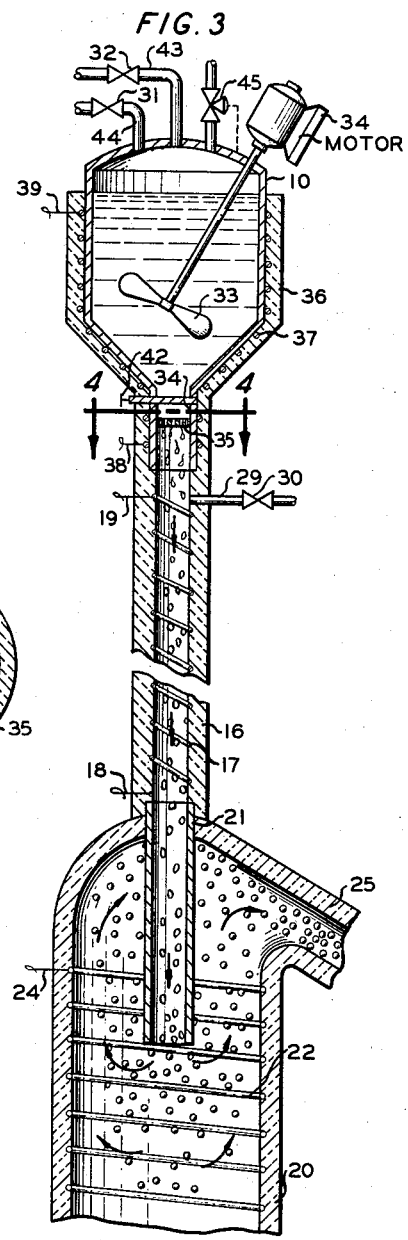
INVENTOR.
R.D. SNOW
BY Hudson and Young
ATTORNEYS March 22, 1960  R. D. SNOW  2,929,106
PROCESS OF MANUFACTURE OF HOLLOW SPHERES
Filed Dec. 31, 1954  2 Sheets-Sheet 2
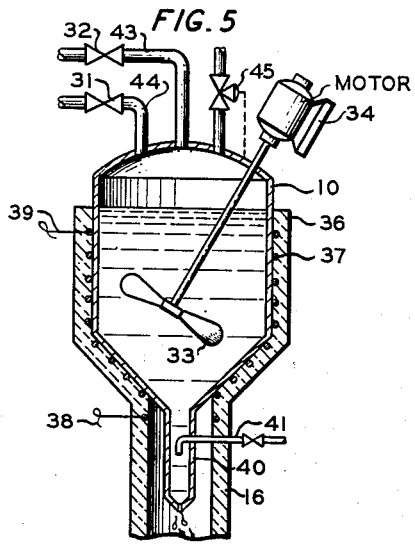
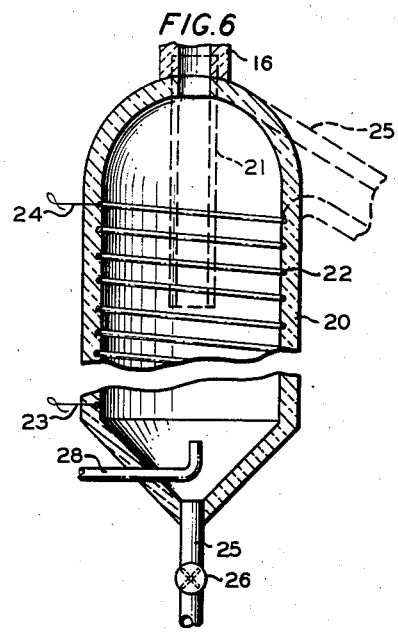
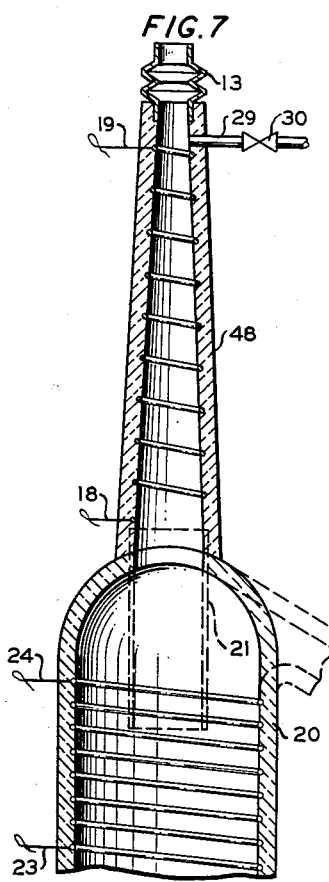
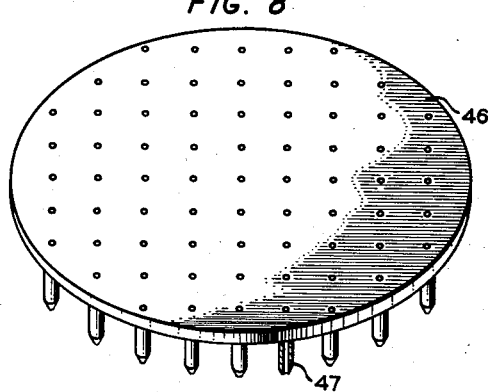
INVENTOR.
R. D. SNOW
BY
ATTORNEYS

United States Patent Office 2,929,106
Patented Mar. 22, 1960

2,929,106

PROCESS OF MANUFACTURE OF HOLLOW SPHERES

Robert D. Snow, Bartlesville, Okla., assignor to Phillips Petroleum Company, a corporation of Delaware Application December 31, 1954, Serial No. 479,185

12 Claims. (Cl. 18—47.2)

This invention relates to the manufacture of hollow spheres. In one aspect this invention relates to manufacturing hollow spheres from materials capable of condensing to a thermosetting resin and concomitantly liberating a gas. In another aspect this invention relates to apparatus for the manufacture of hollow spheres.

It has been proposed to place a layer of light hollow spheres (microspheres) on the surface of a volatile liquid, such as crude oil, to minimize the loss of vapors therefrom. Generally in such use a layer approximately one inch thick of hollow spheres is placed on the surface of the volatile liquid. Such hollow spheres, when having flexible walls, can also be used to compensate for the thermal expansion of a liquid, such as the insulating oil in a lead sheathed cable. In such use the thermal expansion of the liquid is absorbed by the hollow spheres rather than being exerted against the lead sheathing of the cable. These and other uses have made the production of light weight hollow spheres in large amounts highly desirable. However, such production has been a costly process.

I have discovered that when heat is applied to a particle of an intermediate condensation product of hexamethylenetetramine and phenol, the surface layer of said particle fuses and as condensation progresses ammonia gas is evolved internally which tends to inflate said surface layer, which is in a plastic condition, to a hollow sphere. As heating continues, the resinous envelope further condenses or cures to an insoluble, infusible, flexible, solid.

When a finely ground fibrous material such as ground wood (wood flour), finely ground fiber glass, finely ground asbestos etc. is incorporated into the resinous material during the condensation there is produced a reinforced hollow sphere. Said fibers serve to strengthen the final film forming the wall of the hollow sphere.

Thus, broadly speaking, my invention comprises heat curing, while falling freely through space or being conveyed by a gas stream, of a granule or liquid droplet of a material capable of condensing to a thermosetting resin and concomitantly liberating a gas.

An object of this invention is to provide a reinforced hollow spheroidal body.

Another object of this invention is to provide a process for manufacturing hollow spheres.

Another object is to provide light-weight, resin, hollow spheres, and/or spheroids, suitable for use in minimizing vapor losses from storage receptacles containing volatile liquids.

Another object is to provide a process for manufacturing hollow spheres and/or spheroids from a resinous material capable of further condensation to a thermosetting resin and concomitantly liberating a gas.

Another object is to provide apparatus for the manufacture of hollow spheres and/or hollow spheroids.

Still other objects and advantages of the invention will be apparent to those skilled in the art from a reading of this disclosure, the drawings and the appended claims.

Thus, according to the invention there is provided a process for the manufacture of hollow spheres which comprises passing a finely divided material, capable of condensing to a thermosetting resin while concomitantly liberating a gas, through a heating zone and recovering resulting hollow spheres.

Further according to the invention there is provided a process for the manufacture of a reinforced hollow sphere which comprises passing a finely divided material, capable of condensing to a thermosetting resin and concomitantly liberating a gas and having incorporated therein a finely ground fibrous material in a reinforcing amount, through a heating zone and recovering resulting hollow reinforced spheres.

It is to be noted that the material from which the hollow spheres are made is capable of condensing to a thermosetting resin and concomitantly liberating a gas. The finely divided material can be either a solid or a liquid. The invention can be carried out with a solution of reactants, which react to give a thermosetting resin, and progressively carrying condensation forward to the end product, or the reactants can be reacted to an intermediate condensation product which is then cured to the final condensation product. Generally, the gas liberating component is a reactant which reacts to give the thermosetting resin, such as hexamethylenetetramine in the phenol-hexamethylenetetramine system mentioned above. However, in an alternate but not necessarily equivalent method, an added blowing agent capable of liberating a gas under the process conditions can be used, as in the phenol-aldehyde systems discussed hereinbelow.

The attached drawings illustrate diagrammatically various methods and apparatus for carrying out my invention.

Figure 1 is a cross section of a hollow sphere prepared according to the invention.

Figure 2 illustrates diagrammatically one arrangement of apparatus which can be employed to carry out the invention.

Figure 3 illustrates diagrammatically another arrangement of apparatus which can be employed to carry out the invention.

Figure 4 is a plan view of the perforated plate shown in Figure 3.

Figure 5 illustrates diagrammatically a modification of the apparatus shown in Figure 3 wherein spraying or atomizing means are substituted for the perforated plate of Figure 3.

Figure 6 illustrates diagrammatically a modification of the apparatus shown in Figure 1 wherein provision is made for withdrawing the product spheres from the bottom of the heating zone.

Figure 7 illustrates diagrammatically another modification of the apparatus shown in Figure 6.

Figure 8 is an isometric view of an alternative form of the perforated plate shown in Figure 3.

Figure 9 is a cross section of a reinforced hollow sphere prepared according to the invention.

While not limited thereto the invention will be described using hexamethylenetetramine and phenol to prepare hollow spheres. Hexamethylenetetramine is the reaction product of 6 mols of formaldehyde and 4 mols of ammonia. Two structural formulas have been proposed:

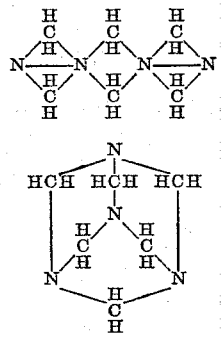

In either case, each mol of hexamethylenetetramine can contribute six methylene groups to the phenol condensation with the concomitant evolution of 4 mols of ammonia. Hence, the stoichiometric proportions to form Bakelite type thermosetting resins are approximately one mol hexamethylenetetramine to 6 to 7 mols of a phenol.

In a presently preferred embodiment of the invention hexamethylenetetramine and a phenol are heated either in the dry condition or in an aqueous solution until an intermediate fusible resin is formed. After cooling, this resin, which is quite brittle, is ground and sifted to separate granules of close size ranges, e.g. 20–30, 40–60, 80–100, 100–200 and passing 300 mesh. A selected range of granules is fed into the top of a heated zone, such as a vertical tube furnace, so that each individual granule falls freely and is heated, mainly by radiation, such that the secondary condensation and curing are substantially completed when the resulting sphere has traversed the heating zone.

When it is desired to prepare the reinforced hollow sphere of the invention a finely ground fibrous material is added to the starting materials or intimately mixed with the intermediate condensation product prior to solidification and comminution.

The final curing is accomplished by heating the particle or droplet by radiation and by hot gas currents to a temperature in the range 100–300° C., with a range of 200–300° C. generally preferred. Controlled upward air currents can be employed to keep the forming spheres in the heating zone long enough to complete the cure; or the granules can be projected horizontally into rising air currents of controlled velocity to keep the spheres in the heated zone until the desired size and cure are obtained.

In place of hexamethylenetetramine and phenol, a mixture of ammonia, formaldehyde and phenol with a suitable non-acidic catalyst well known in the art can be used as the starting material.

Referring now to the drawings the invention will be more fully explained. Like reference numerals are employed to denote like elements of apparatus where possible.

In Figure 2 reference numeral 10 denotes a hopper or container with an inlet conduit 11 having a slide valve 12 therein. The bottom of hopper 10 is swaged as shown and extends into a flexible conduit outlet 13. Positioned within said conduit outlet 13 at about the mid-portion thereof is a vibrating screen 14 operatively connected to vibrating means 15 which comprises a rod attached to an eccentric driven by an electric motor. Other means for vibrating said screen 14 can be employed. Conduit outlet 13 extends into the inlet end of a tubular furnace conduit 16 comprised of a refractory ceramic material having heating element 17 embedded in the inner wall thereof. Electrical energy is supplied to heating element 17 through leads 18 and 19 from a source not shown. The amount of heat supplied to the interior of tubular furnace conduit 16 can be varied by varying the amount of electrical energy supplied to heating element 17 or by varying the size and spacing of the windings in heating element 17, i.e., to introduce more heat into the lower portion of said tubular furnace conduit the windings of heating element 17 can be spaced closer together than in the upper portion of said tubular furnace conduit, or if desired, heating element 17 can be divided into two or more heating elements connected to separate electrical leads. In this manner one can control and increase the heating progressively along the length of said tubular furnace conduit 16. While electrical heating means have been described and shown for heating tubular furnace conduit 16 and vessel 20 (described below) other heating means can be employed. Heating of said furnace conduit can be done indirectly by flames, steam etc. or indirectly by hot air, combustion gases etc. Generally speaking radiant heat is preferred. Tubular furnace conduit 16 is shown as being comprised of a refractory ceramic material, however, said tubular furnace conduit can be fabricated of metal covered with a sheathing of insulation and heating element 17 placed between said metal and said insulation.

The outlet end of tubular furnace conduit 16 is connected to a substantially cylindrical vessel 20 also made of ceramic refractory material. Vessel 20 can also be made of metal and insulated as described in connection with tubular furnace conduit 16. Extending from the outlet end of said conduit 16 along the longitudinal axis of and into said vessel 20 is a pipe 21. Heating element 22 is embedded in the inner wall of vessel 20. Electrical energy is supplied to heating element 22 through leads 23 and 24. The amount of heat introduced into the interior of vessel 20 can be varied progressively along its length and controlled in a manner similarly as described above in connection with tubular furnace conduit 16. Extending from the upper portion of said vessel 20 is an outlet 25 having rotary valve 26 positioned therein. A suitable blower 27 is connected to the lower portion of vessel 20 by means of pipe 28 for the delivery of hot gases into said vessel 20. An outlet 29 having a valve 30 therein is positioned in the upper portion near the inlet end of tubular furnace conduit 16 and serves to permit a flow of hot gases through said tubular conduit 16. Back pressure control valve 45 and slide valve 12 can be employed to maintain the system under pressures above atmospheric when desired.

While not shown in the drawings the tubular furnace conduit 16 could be extended in length, and vessel 20 eliminated. In such instances valve 26 would be placed at the lower end of tubular furnace conduit 16 and gas inlet 28 would be placed in the lower end of tubular furnace conduit 16 above said valve 26.

In the apparatus of Figure 3 a hopper or container 10 is provided with inlet means 44 and 43, having valves 31 and 32 therein, suitable for the introduction of liquids into said hopper or container 10. A stirrer 33 driven by motor 34 is mounted so as to agitate the contents of hopper or container 10. The lower portion of container 10 is swaged to form a conduit outlet 34 having a valve 42 therein. Said conduit outlet 34 has a perforated plate 35 positioned at about the mid-portion thereof. Container 10 which is preferably made of metal, is insulated with insulation 36 and a heating element 37, comprising windings of resistance wire, surrounds said vessel 10 beneath said insulation 36. Electrical energy is supplied to heating element 37 through leads 38 and 39. The remainder of the apparatus shown in Figure 3 is like that of Figure 2 except that tubular furnace conduit 16 can be longer for reasons given hereinafter.

Figure 5 shows a modification of the hopper or container 10 of Figure 3 wherein the bottom portion of said container 10 terminates in a spraying or atomizing nozzle 40. An atomizing fluid such as air can be introduced into nozzle 40 through pipe 41.

In Figure 7 there is illustrated a modification of the apparatus wherein a furnace conduit having a frustoconical shape is employed. Conical furnace conduit 48 can be employed with the remainder of the apparatus shown in Figures 2 and 3. Pipe 21, shown as a dotted line in Figure 7, can be used if desired. Generally, however, it is preferred to employ a pipe such as pipe 21 only in those instances when outlet 25 from vessel 20 is in the upper portion of said vessel. When the outlet from said vessel is in the lower portion of said vessel, as in Figures 6 and 7, pipe 21 is generally not employed. Conical furnace conduit 48, as with tubular conduit 16, can be extended in length and vessel 20 eliminated.

Figure 8 illustrates a type of perforated plate particularly adapted for use with some intermediate condensation products having a low surface tension. Extending downwardly from each perforation in plate 46 is a capillary 47 having a tapered end terminating in a thin sharp ring. Said capillaries aid in the formation of distinct droplets.

When carrying out one embodiment of the method of the invention in the apparatus shown in Figure 2, a finely divided solid intermediate condensation product, such as that prepared from hexamethylenetetramine and phenol, as described herein below, is placed into hopper 10 and introduced into tubular furnace conduit 16 by means of vibrator screen 14. In tubular furnace conduit 16 the surface layer of each particle fuses and as condensation progresses, ammonia gas is liberated internally of said particles and inflates the surface layer, which is in a plastic condition, to a hollow sphere. Said particles fall through tubular furnace conduit 16 into vessel 20 wherein heating is continued. As the heating continues in tubular furnace conduit 16 and vessel 20, the resinous envelope forming the hollow sphere further condenses and/or cures to an insoluble, infusible, flexible, solid. In vessel 20 said particles are maintained in suspended flight by means of a stream of hot gas introduced through line 28 and are conveyed from vessel 20 as a finished product through outlet 25. While the particles in tubular furnace conduit 16 are in a substantially freely falling condition their rate of fall can be controlled to a large extent by venting a portion of the hot gases, introduced through line 28, through conduit 29 and valve 30 at the upper portion of tubular furnace conduit 16 as will be understood by those skilled in the art. The interior of tubular conduit 16 and vessel 20 can be maintained at substantially the same temperature or if desired the interior of vessel 20 can be maintained at a temperature different, generally higher, than that of tubular conduit 16.

When carrying out another embodiment of the method of the invention in the apparatus shown in Figure 3, reactants, such as hexamethylenetetramine and phenol, are introduced into container 10 through inlets 44 and 43 and heated to form an intermediate condensation product. The step of allowing said intermediate condensation product to cool and solidify and then comminuting is omitted in this embodiment of the invention. After said intermediate condensation product has formed in container 10 and while it is still liquid, valve 42 is opened and said intermediate condensation product is permitted to drop through perforated plate 35 as droplets into tubular furnace conduit 16 and vessel 20 wherein further condensation is effected with concomitant liberation of ammonia gas as described in connection with Figure 2, to form the hollow spheres of the invention. The size of the hollow spheres can be regulated by the size of the openings in plate 35. The rate of fall of said droplets through tubular furnace conduit 16 is controlled as in Figure 2 by venting a portion of the hot gases through vent 29 and valve 30. Preferably tubular conduit 16 is of such a length and is operated at such a temperature progressively along its length that by the time the liquid droplets enter vessel 20 the surface layer of said droplets has substantially condensed to a hard layer. Condensation is completed in vessel 20. Said particles are maintained in flight in vessel 20 by means of the hot gas introduced into line 28.

Another embodiment of the method of the invention can be carried out in the apparatus shown in Figure 5. A solution of reactants, such as hexamethylenetetramine and phenol, is introduced into container 10 and sprayed into tubular furnace conduit 16 through atomizing nozzle 40 by means of the atomizing medium introduced through line 41. In this embodiment of the invention at least the first portion of tubular furnace conduit 16 becomes a first portion of a heating zone wherein a liquid intermediate condensation product is formed. As said liquid particles progress through tubular furnace conduit 16 and into vessel 20 (a second portion of said heating zone) further condensation with concomitant liberation of ammonia gas is effected to form hollow spheres of the invention. In this embodiment of the invention it is preferable to maintain the liquid particles in tubular furnace conduit 16 under time-temperature conditions such that by the time the liquid droplets enter vessel 20 the surface layer of said particles has substantially condensed to a hard layer. Condensation is then completed in vessel 20. This embodiment is particularly adapted for the manufacture of very small spheres such as microballoons.

All of the above embodiments of the method of the invention can be carried out in the modifications of the apparatus shown in Figures 6 and 7. The actual apparatus to be employed will depend upon the size and properties of the product hollow spheres as will be understood by those skilled in the art in view of this disclosure. For example, when very small light weight spheres are being manufactured it is generally desirable to employ apparatus of the type shown in Figure 2, wherein the outlet from vessel 20 is in the top portion thereof. When larger heavy spheres are being manufactured it is generally desirable to employ a bottom draw-off from vessel 20.

The following example further illustrates the invention:

*Example*

Phenol and hexamethylene tetramine in molal proportions of approximately 6:1 were mixed and heated in a beaker at 160° C. for 15 minutes. The product which was a brittle amber colored solid when cooled to room temperature, was crushed in a mortar and screened with standard sieves. Granules of the 30-50 mesh fraction were dropped into the top of a vertical tube furnace about 2 inches in diameter and 4 feet tall, heated to about 250° C. Hollow spheres about the size of a pea were obtained at the bottom of the furnace.

The actual choice of temperature to be employed in the heating zone or zones of my invention will depend upon the type of resin used, the size of the hollow spheres or spheroids to be manufactured, the method employed etc. as will be understood by those skilled in the art. The intermediate condensation product is usually formed at a temperature within the range of 100–200° C., and preferably, in most instances, within the range 150–180° C. The final curing is usually effected at a temperature within the range of 100–300° C., and preferably, in most instances, within the range 200–300° C. Generally speaking the temperature increases along the direction of flow through the heating zone. However, the invention is not so limited. For example, the entire heating zone can be at one temperature, or for example, the lower portion of tubular conduit 16 of Figures 2 and 3 can be at a higher temperature than vessel 20. As will be understood by those skilled in the art the choice of temperature cannot be made on the basis of temperature alone; time in the heating zone must be considered along with the other factors mentioned above. Thus, for each resin used and each type of hollow sphere product there is an optimum time-temperature relationship.

As indicated above, the size and wall thickness of the spheres can be varied by controlling the proportion of hexamethylenetetramine, or other gas forming component, the degree of initial condensation, the size of granule, and, to a lesser degree, the time-temperature relationship. For very small spheres, such as microballoons, material reduced to 300 mesh, or finer, is used and control of the material through the final heating zone can be entirely by gas currents, which can flow in any direction, since the fine resin particles and the resulting "microballoons" are readily carried by the gas currents. It would be advantageous to use an upward current of gas since the inflated microballoons could be floated out of the heating zone. Curing is fairly rapid owing to the thin layer of material and the surface area exposed to heat.

As discussed above in connection with the drawings the steps of cooling the initial condensation product to a solid, comminution and sizing thereof, can be eliminated and the process conducted continuously by feeding the reactant in proper proportions to a first heating zone and spraying or atomizing the product from this first heating zone into a final heating zone where the hollow spheres form and are cured.

The heating zone of any of the above described methods for preparing the hollow spheres or spheroids can be operated at pressures above atmospheric pressure so as to control the internal pressure of the product spheres. As will be recognized by those skilled in the art of synthetic resins I can vary the proportions of phenol and hexamethylenetetramine over a fairly wide range and still obtain an intermediate condensation product which fulfills the main requirements of the final stage of my process; namely that it must be capable of comminution as a solid or dispersion as fine droplets of liquid, it must be fusible if a solid, it must liberate adequate gas to inflate the spheres during the final stages of condensation, and the finally cured product must have adequate strength, elasticity, etc., for the intended purpose. I may use as high a ratio as 12 mol phenol to one mol hexamethylenetetramine, but I prefer to use more nearly the stoichiometric proportions.

Other suitable, but not necessarily equivalent, phenolic compounds, such as cresols, xylenol, resorcinol, etc., may be substituted for part or all of the ordinary phenol. As will be understood by those skilled in the art the choice of the actual phenolic compound will depend upon the properties desired in the final product.

It is also within the scope of my invention to prepare an intermediate condensation product from a carbonate ester of a phenolic compound such as diphenyl carbonate and an aldehyde such a formaldehyde or paraformaldehyde, and pass this resinous material in suitable finely divided form through a heating zone, as described herein, whereby hollow spheres or spheroids inflated with $CO_2$ are obtained.

Aldehydes such as formaldehyde, paraformaldehyde, acetaldehyde, furfural, etc., may be substituted for a part of the hexamethylenetetramine, so long as the intermediate condensation product has sufficient capacity to liberate gaseous ammonia (or other gas from an added blowing agent) to achieve the desired inflation of the spheres during the final heating edge. The hexamethylenetetramine may be entirely replaced by aldehydes if a blowing agent, such as those used in the production of sponge rubber, is added, but the blowing agent must be compatible with the phenol-aldehyde mixture. Ammonium carbonate and ammonium bicarbonate are examples of satisfactory blowing agents. When the hexamethylenetetramine is replaced with an aldehyde and a blowing agent is used, said blowing agent is best used by incorporating same in an aqueous solution of the other reactants, i.e., the phenol and the aldehyde.

While the invention has been described in terms of phenolic condensation products and particularly in terms of the phenol-hexamethylenetetramine system, other systems which are capable of yielding a thermosetting resin are within the scope of the invention. Examples of such systems are the urea-aldehyde systems and melamine-aldehyde systems.

As will be evident to those skilled in the art, various modifications of the invention can be made, or followed, in the light of the above disclosure and the attached drawings, without departing from the spirit or scope of said disclosure, drawings or the appended claims.

I claim:

1. A process for the manufacture of discrete hollow spheres which process comprises, in combination, the steps of: dropping finely divided particles consisting essentially of a material, capable of chemically condensing to a thermoset resin with concomitant liberation of a gas internally of said particles, through a vertically elongated heating zone; supplying radiant heat energy to said particles in said heating zone to cause simultaneous fusion and final condensation of said particles to said thermoset resin with concomitant internal liberation of said gas so as to inflate said particles internally without rupture of same; and recovering the thus formed spheres of insoluble, infusible, thermoset resin.

2. A process according to claim 1 wherein said material is a fusible intermediate condensation product formed by reacting phenol and hexamethylenetetramine in molal proportions within the range of about 1:1 to 7:1 and is in the form of a finely divided solid.

3. A process according to claim 1 wherein said material is an intermediate condensation product formed by reacting phenol and hexamethylenetetramine in molal proportions within the range of about 1:1 to 7:1 and is in the form of a finely divided liquid.

4. A process according to claim 1 wherein said material is a solution of phenol and hexamethylenetetramine present in a molal ratio within the range of about 1:1 to 7:1.

5. A process for the manufacture of discrete hollow spheres which process comprises, in combination, the steps of: dropping finely divided particles of a material consisting essentially of a plurality chemically condensed material capable of final chemical condensation to a thermoset resin with concomitant liberation of a gas internally of said particles, through a vertically elongated heating zone countercurrent to a stream of heated gas being passed through said heating zone; in said heating zone heating said particles to a temperature within the range of 100 to 300° C. for a period of time sufficient to simultaneously cause fusion and final condensation of said particles with concomitant internal liberation of said liberated gas so as to inflate said particles internally without rupture of same; controlling the residence time of said particles in said heating zone by controlling the amount of said countercurrent stream of heated gas flowing through said heating zone; and recovering the thus formed hollow spheres of insoluble, infusible thermoset resin.

6. A process according to claim 5 wherein said material is a fusible intermediate condensation product formed by reacting phenol and hexamethylenetetramine in molal proportions within the range of about 1:1 to 7:1 and is in the form of a finely divided solid.

7. A process according to claim 5 wherein said material is an intermediate condensation product formed by reacting phenol and hexamethylenetetramine in molal proportions within the range of about 1:1 to 7:1 and is in the form of a finely divided liquid.

8. A process for the manufacture of discrete hollow resin spheres of small diameter from a material consisting essentially of an intermediate condensation product capable of further chemical condensation to a thermoset resin with concomitant liberation of a gas, which process comprises, in combination, the steps of: introducing finely divided particles of said intermediate condensation product into the upper portion of a vertically elongated first heating zone; passing said particles through said first heating zone countercurrent to a stream of heated gas introduced into the lower portion of said first heating zone from a second heating zone described further hereinafter; applying radiant heat energy to said particles while passing same through said first heating zone so as to cause further condensation thereof with concomitant internal liberation of said liberated gas which inflates said condensing particles internally without rupture of same and form hollow spheres of substantially condensed thermosetting resin; passing said hollow spheres from said first heating zone into an intermediate portion of a second heating zone; maintaining said spheres in suspended upward flight in said second heating zone by introducing a stream of a heated gas into the lower portion of said second heating zone; applying radiant heat energy to said spheres in said second heating zone so as to complete condensation and cure the shell of same to an insoluble, infusible, thermoset resin; withdrawing completed hollow spheres from the upper portion of said second heating zone; and controlling the residence time of said particles in said first heating zone by controlling the amount of said countercurrent stream of heated gas flowing through said first heating zone.

9. A process for the manufacture of discrete hollow resin spheres of small diameter from a material consisting essentially of an intermediate condensation product formed by reacting phenol and hexamethylenetetramine in molal proportions within the range of about 1:1 to about 7:1, said intermediate condensation product being capable of further chemical condensation to a thermoset resin with concomitant liberation of ammonia gas, which process comprises, in combination, the steps of: introducing said intermediate condensation product in the form of liquid droplets into the upper portion of a vertically elongated first heating zone; passing said droplets through said first heating zone countercurrent to a stream of heated gas introduced into the lower portion of said first heating zone from a second heating zone described further hereinafter; applying radiant heat energy to said droplets while passing same through said first heating zone so as to cause further condensation thereof with concomitant internal liberation of said ammonia gas which inflates said condensing droplets internally without rupture of same and form hollow spheres of substantially condensed thermosetting resin; passing said hollow spheres from said first heating zone into an intermediate portion of a second heating zone; maintaining said spheres in suspended upward flight in said second heating zone by introducing a stream of a heated gas into the lower portion of said second heating zone; applying radiant heat energy to said spheres in said second heating zone so as to complete condensation and cure the shell of same to an insoluble, infusible, thermoset resin; withdrawing completed hollow spheres from the upper portion of said second heating zone; and controlling the residence time of said droplets in said first heating zone by controlling the amount of said countercurrent stream of heated gas flowing through said first heating zone.

10. A process for the manufacture of discrete hollow resin spheres of small diameter from finely divided solid particles of a material consisting essentially of an intermediate condensation product formed by reacting phenol and hexamethylenetetramine in molal proportions within the range of about 1:1 to about 7:1, said intermediate condensation product being capable of further chemical condensation to a thermoset resin with concomitant liberation of ammonia gas, which process comprises, in combination, the steps of: introducing said finely divided solid particles into the upper portion of a vertically elongated first heating zone; passing said particles through said first heating zone countercurrent to a stream of heated gas introduced into the lower portion of said first heating zone from a second heating zone described further hereinafter; applying radiant heat energy to said particles while passing same through said first heating zone so as to cause further condensation thereof with concomitant internal liberation of said ammonia gas which inflates said condensing particles internally without rupture of same and form hollow spheres of substantially condensed thermosetting resin; passing said hollow spheres from said first heating zone into an intermediate portion of a second heating zone; maintaining said spheres in suspended upward flight in said second heating zone by introducing a stream of heated gas into the lower portion of said second heating zone; applying radiant heat energy to said spheres in said second heating zone so as to complete condensation and cure the shell of same to an insoluble, infusible, thermoset resin; withdrawing completed hollow spheres from the upper portion of said second heating zone; and controlling the residence time of said particles in said first heating zone by controlling the amount of said countercurrent stream of heated gas flowing through said first heating zone.

11. A process according to claim 9 wherein: said molal ratio is about 6:1; said droplets are heated to a temperature within the range of 100 to 300° C. in said first heating zone; and said spheres are heated to a temperature within the range of 200 to 300° C. in said second heating zone.

12. A process according to claim 10 wherein: said molal ratio is about 6:1; said particles are heated to a temperature within the range of 100 to 300° C. in said first heating zone; and said spheres are heated to a temperature within the range of 200 to 300° C. in said second heating zone.

References Cited in the file of this patent
UNITED STATES PATENTS

| | | |
|---|---|---|
| 2,038,251 | Vogt | Apr. 21, 1936 |
| 2,101,635 | Bender | Dec. 7, 1937 |
| 2,421,902 | Neuschotz | June 10, 1947 |
| 2,572,484 | Howle et al. | Oct. 23, 1941 |
| 2,572,998 | Eisner | Oct. 30, 1951 |
| 2,576,977 | Stober | Dec. 4, 1951 |
| 2,592,659 | Cone | Apr. 15, 1952 |
| 2,593,976 | Milburn | Apr. 22, 1952 |
| 2,602,193 | Korkatti | July 8, 1952 |
| 2,676,892 | McLaughlin | Apr. 27, 1954 |
| 2,678,293 | McMillan et al. | May 11, 1954 |
| 2,691,800 | Seavey | Oct. 19, 1954 |
| 2,699,576 | Colbry | Jan. 18, 1955 |
| 2,714,224 | Schaub | Aug. 2, 1955 |

OTHER REFERENCES

Ellis: "The Chemistry of Synthetic Resins," published by Reinhold Publishing Corp., New York (1935) (vol. 1, pages 307 to 310 relied upon).